United States Patent [19]

Nagamori et al.

[11] Patent Number: 5,036,415
[45] Date of Patent: Jul. 30, 1991

[54] MAGNETIC HEAD SUPPORTING DEVICE WITH PREDETERMINED SURFACE ROUGHNESS TO MINIMIZE DEWING AND ADHERENCE

[75] Inventors: Shuichi Nagamori; Toru Yoshida, both of Furukawa, Japan

[73] Assignee: Alps Electric Co., Ltd., Tokyo, Japan

[21] Appl. No.: 348,236

[22] Filed: May 5, 1989

[30] Foreign Application Priority Data

Aug. 23, 1988 [JP] Japan ................ 63-207429

[51] Int. Cl.$^5$ ............................. G11B 21/20
[52] U.S. Cl. ....................... 360/104; 360/130.34
[58] Field of Search ............ 360/104, 102, 103, 105, 360/106, 101, 130.34

[56] References Cited

U.S. PATENT DOCUMENTS

| 4,003,091 | 1/1977 | Wright | 360/102 |
| 4,074,330 | 2/1978 | Norton et al. | 360/102 |
| 4,414,592 | 11/1983 | Losee et al. | 360/102 |
| 4,578,727 | 3/1986 | Hills | 360/102 |
| 4,600,955 | 7/1986 | Regruit | 360/102 |
| 4,620,250 | 10/1986 | Hills | 360/102 |
| 4,792,874 | 12/1988 | MacDonald, II et al. | 360/102 |
| 4,833,556 | 5/1989 | Kosarko et al. | 360/102 |
| 4,875,276 | 10/1989 | Yunokuchi et al. | 360/104 |

FOREIGN PATENT DOCUMENTS 0094563 4/1989 Japan .................. 360/104

Primary Examiner—John H. Wolff
Assistant Examiner—Craig A. Renner
Attorney, Agent, or Firm—Guy W. Shoup; David W. Heid

[57] ABSTRACT

A magnetic head supporting device includes a support member for supporting a magnetic head in opposed relationship to a magnetic disk. The support member is formed with an outer peripheral projection to define a recess inside thereof. When the magnetic disk is rotated in proximity to the recess, there is generated a partial vacuum in a space defined between the magnetic disk and the recess to suck the magnetic disk into the recess. A surface of the outer peripheral projection of the support member facing the magnetic disk has a predetermined surface roughness permitting communication of air between inside and outside of the recess and permitting suction of the magnetic disk into the recess due to the partial vacuum during rotation of the magnetic disk at a high speed. With this setting of the surface roughness, the occurrence of dewing and adherence of the disk to the support member can be prevented.

1 Claim, 2 Drawing Sheets

MAGNETIC HEAD SUPPORTING DEVICE WITH PREDETERMINED SURFACE ROUGHNESS TO MINIMIZE DEWING AND ADHERENCE

BACKGROUND OF THE INVENTION

The present invention relates to a magnetic head supporting device for use with a magnetic disk driving device for recording or reproducing information with respect to a disk-like magnetic recording medium.

Such a magnetic disk driving device for recording or reproducing information with respect to a disk-like magnetic recording medium (which will be hereinafter referred to as a disk) is widely used as an external storage for an information processing apparatus such as computer and work processor.

An example of the information processing apparatus is a so-called still video floppy disk driving device. The disk driving device is installed in a still video floppy camera, and it is designed to record video information on a still video floppy disk in the same manner as with a camera device using a photosensitive film.

This type of disk driving device is disclosed in Japanese Patent Laid-open Publication No. 58-57667, for example. In this prior art disk driving device, a holder for holding a disk cartridge containing a disk is rotatably supported to a mounting substrate having a rotating bed. In loading the disk, the disk cartridge is inserted into the holder, and the holder is rotated to the mounting substrate to load the disk in the disk cartridge onto the rotating bed. A restriction plate for applying a load pressure is mounted to a case cover, and it is opposed to a magnetic head with the disk interposed therebetween when the disk is loaded.

Another disk driving device capable of stabilizing the contact between the disk and a gap of the magnetic head without using the above-mentioned restriction plate is disclosed in Japanese Utililty Model Publication No. 42-17806, for example.

This prior art relates to a device for recording and reproducing a signal as rotating a very thin magnetic disk sheet of 50 μ or less thick at a high speed such that the magnetic disk sheet can be maintained under a planar condition by a centrifugal force. A base mounting the sheet thereon is formed with a recess where a magnetic head is adjustably received. The recess is slightly inclined in a direction opposite to a rotative direction of the sheet in accordance with deformation of the sheet passing over the recess. During the rotation of the sheet, the pressure between the magnetic sheet and the base is rendered slightly smaller than the pressure over the magnetic sheet, resulting that the magnetic sheet is sunk into the recess. Accordingly, the contact between the magnetic sheet and a head gap of the magnetic head projecting upwardly from a head mounting surface may be stabilized.

The still video floppy disk driving device (which will be hereinafter referred to as SVF device) in the former prior art is provided with two head gaps so as to record and reproduce a frame image. Accordingly, a difference in opposing condition and load pressure of the disk to the two head gaps causes a difference in recording and reproducing performance of field images, resulting in a deterioration of picture quality of the frame image. Therefore, adjustment of the image by a spacing adjusting screw is greatly important in the structure having the aforementioned restriction plate. However, since the restriction plate is flat, a slight difference in inclination of the restriction plate causes a great change in picture quality. Thus, the adjustment is greatly difficult. Further, since a peripheral speed of the disk at its radially inner position is different from that at its radially outer position, a relative speed between the disk and the restriction plate at the radially inner position is different from that at the radially outer position, causing a change in positional relation of the disk relative to the two head gaps between at the radially inner and outer positions. As a result, a fine difference in image is generated.

In the latter prior art, the disk sheet is flexed as if it were sucked into the recess to face the head gap of the magnetic head under constant condition. Accordingly, it is possible to maintain a constant video quality in recording and reproducing information without the necessity of especially restricting the position of the disk sheet with respect to the head gap.

However, the inventor has found that the SVF device in the latter prior art has a shortcoming such that the disk adheres to a sheet bed to cause incapability of rotation of the disk. Such a phenomenon depends on two factors consisting of a surface roughness of an outer peripheral projection of the sheet bed and a humidity in the air. If the two factors satisfy certain conditions, the above phenomenon will be assumed to occur. When the disk adheres to the sheet bed, the air in the recess appears to be sealed by the disk. Although such adherence of the disk disappears after a given time (about 10 seconds) to permit the rotation of the disk, continuous photographing is interrupted by the adherence of the disk. Especially, in applying the SVF device to data recording, there is a possibility that data writing/reading will be rendered impossible, which means instability of writing/reading.

In connection with adherence of the disk, there is a possibility of dewing on an inside surface of the disk in the recess. This phenomenon will now be described with reference to FIG. 4.

As shown in FIG. 4, a magnetic head support 11 is formed at at least its outer circumference with an annular projection 12 and a recess 13 surrounded by the annular projection 12. The recess 13 has a depth D of about 50 μm from an upper surface 14 of the projection 12. The upper surface 14 is opposed to a lower surface of a disk 15 with a gap L of 1 μm or less defined therebetween. With this arrangement, when an air flow created by rotation of the disk 15 passes through the gap L into the recess 13, the air is suddenly expanded. Namely, adiabatic expansion of the air occurs. As a result, it is considered that pressure and temperature of the air in the recess 13 are reduced to cause dewing W on the inner surfaces of the disk 15 and the projection 12 in the vicinity of a position where the air has entered the recess 13. In this case, the surface roughness of the upper surface 14 of the projection 12 ranges from 0.05 S to 0.1 S.

The occurrence of the dewing W causes wetting of the recording surface of the disk 15 (the lower surface as viewed in FIG. 4) to adversely affect the recording/reproducing performance. Moreover, the gap L between the upper surface 14 of the projection 12 and the lower surface of the disk 15 tends to be closed by the dewing W, causing promotion of the adherence of the disk 15 to the support 11.

SUMMARY OF THE INVENTION

Accordingly, it is an object of the present invention to provide a magnetic head supporting device which may eliminate the occurrence of dewing and adherence of the disk and thereby ensure stable writing/reading.

According to the present invention, there is provided in a magnetic head supporting device including a support member for supporting a magnetic head in opposed relationship to a magnetic disk, said support member being formed with an outer peripheral projection to define a recess inside thereof, wherein when said magnetic disk is rotated in proximity to said recess, there is generated a partial vacuum in a space defined between said magnetic disk and said recess to suck said magnetic disk into said recess; the improvement wherein a surface of said outer peripheral projection of said support member facing said magnetic disk has a predetermined surface roughness permitting communication of air between inside and outside of said recess and permitting suction of said magnetic disk into said recess due to said partial vacuum during rotation of said magnetic disk at a high speed.

With this arrangement, as the surface of the outer peripheral projection of the support facing the magnetic disk has the predetermined surface roughness, the air can be communicated between the inside and the outside of the recess through the unevenness of the surface of the outer peripheral projection. Accordingly, the magnetic disk is maintained separate from the surface of the outer peripheral projection, thus avoiding the adherence of the magnetic disk. Furthermore, even when the air having entered the recess is expanded, a reduction in pressure and temperature of the air causing the occurrence of dewing may be suppressed owing to the predetermined surface roughness of the surface of the outer peripheral projection. Therefore, if the adherence of the magnetic disk were generated, promotion of the adherence due to the dewing can be prevented.

Other objects and features of the invention will be more fully understood from the following detailed description and appended claims when taken with the accompanying drawings.

DETAILED DESCRIPTION OF THE PREFERRED EMBODIMENT

There will now be described a preferred embodiment of the present invention with reference to FIGS. 1 to 3.

Figure 1:
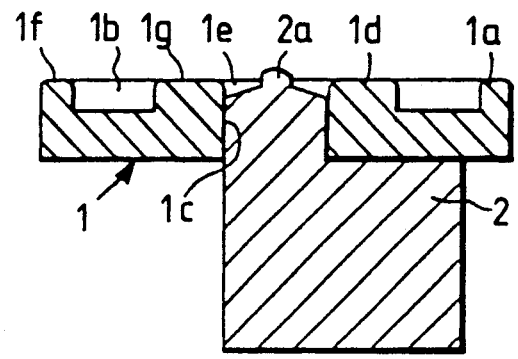
FIG. 1 is a sectional view of a magnetic head supporting device of a preferred embodiment according to the present invention, under the condition where a magnetic disk is supported to the magnetic head supporting device.
Figure 2:
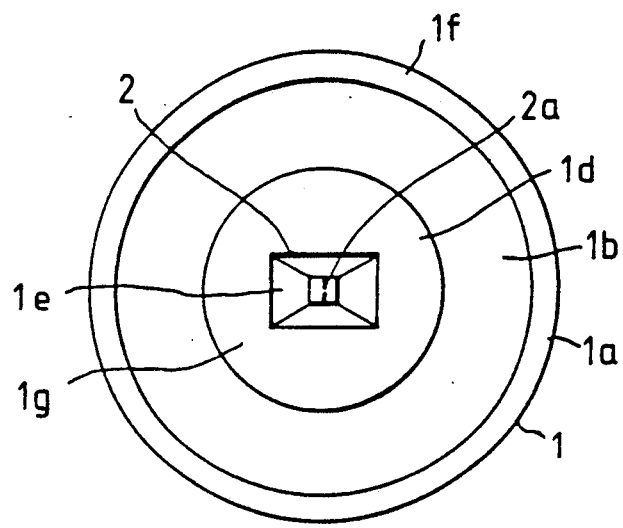
FIG. 2 is a plan view of FIG. 1.
Figure 3:
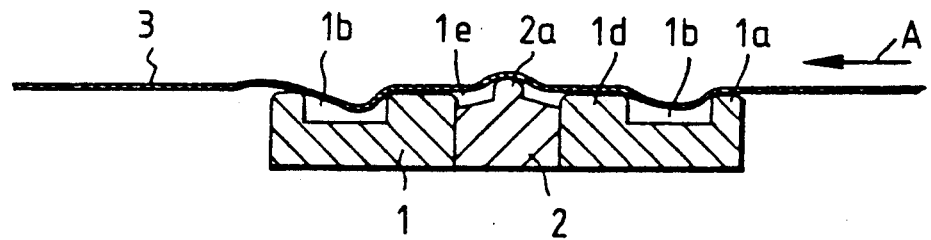
FIG. 3 is a view similar of FIG. 1, illustrating the operation of the present invention.
Figure 4:
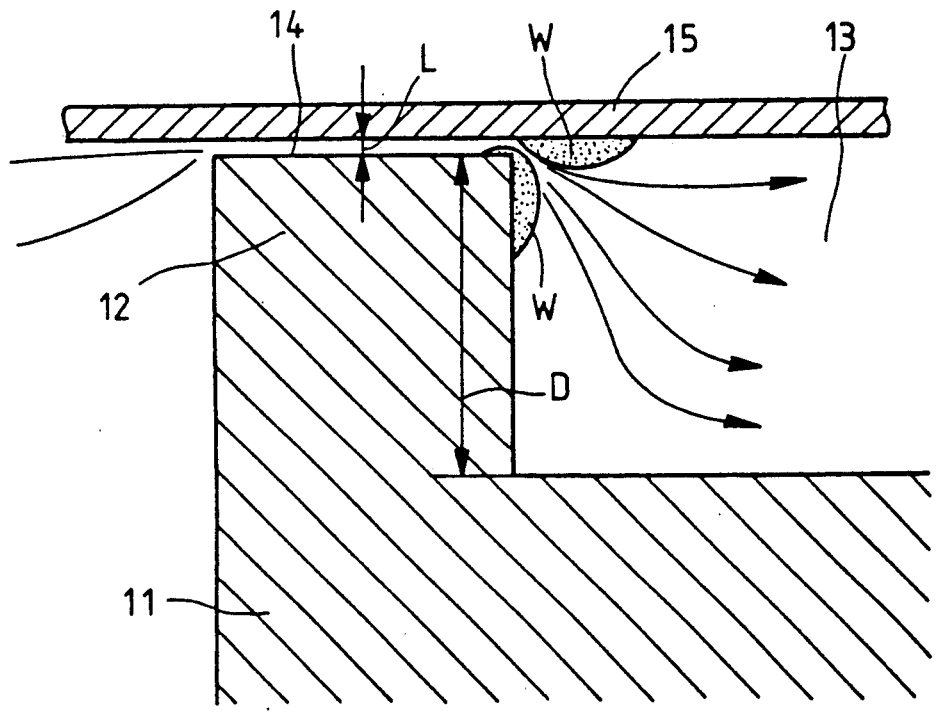
FIG. 4 is an enlarged sectional view of an essential part of the conventional magnetic head supporting device, illustrating the occurrence of dewing.

Referring to FIGS. 1 to 3, the magnetic head supporting device according to the present invention is constructed of a support 1 formed at its center with a mounting hole 1c for mounting a magnetic head 2. The support 1 is further formed at its outer circumference with a first annular projection 1a and at its inner circumference with a second annular projection 1d to define a first recess 1b therebetween. As apparent from FIG. 1, there is also defined a second recess 1e between the second projection 1d and a gap forming portion 2a of the magnetic head 2.

The magnetic head 2 is fixed to the support 1 in such a manner that the gap forming portion 2a is inserted into the mount hole 1c from the outer side of the support 1 until the gap forming portion 2a slightly projects from an upper surface of the second projection 1d. While an amount of projection of the gap forming portion 2a from the upper surface of the second annular projection 1d is positive in this preferred embodiment, it may become negative according to a forming position and a radius of the second annular projection 1d.

A magnetic disk 3 is located to face surfaces 1f and 1g of the first and second projections 1a and 1d. The surfaces 1f and 1g are finished to have a surface roughness ranging from 0.2 S to 0.3 S. The unit S expresses in microns, the distance $H_{max}$ from a highest crest to a deepest trough within a certain reference length L as a measure of the degree of surface roughness in accordance with Japanese Industrial Standards (JIS). According to JIS, a plurality of reference lengths L (mm) are set to correspond to a plurality of roughly set regions of the distance, and each region contains $H_{max}$ values, as shown in the following table.

| TABLE OF L AND $H_{max}$ REGIONS | |
| --- | --- |
| L (mm) | $H_{max}$ (microns) in Regions |
| 0.3 | 0.1S, 0.2S, 0.4S, 0.8S |
| 1 | 1.5S, 3S, 6S |
| 3 | 12S, 18S, 25S |
| 5 | 35S, 50S, 70S, 10S |

In recording or reproducing information with use of the SVF device as mentioned above, the disk 3 is rotated in a direction as depicted by arrow A in FIG. 3 at a high speed. Accordingly, there is created a vacuum a the first recess 1b, attracting the disk 3 to the upper surface of the support 1 and deforming the disk 3 in accordance with the unevenness of the upper surface of the support 1. The vacuum created at the first recess 1b is induced to the gap forming portion 2a of the magnetic head 2 with the height of the disk 3 being restricted by the second projection 1d because of difference in relative position between the first projection 1a and the first recess 1b in accordance with Bernoulli's theorem. As a result, the disk 3 is deformed at the gap forming portion 2a of the magnetic head 2 in accordance with a curvature of the gap forming portion 2a, thereby stabilizing the sliding contact condition of the disk 3 with respect to the magnetic head 2. In this case, since the second recess 1e is defined between the second projection 1d and the gap forming portion 2a, there is also created a vacuum at the second recess 1e to ensure the deformation of the disk 3 in accordance with the curvature of the gap forming portion 2a.

When the disk 3 is sucked into the recesses 1b and 1e of the support 1, the air is induced through the gap between the projection 1a and the disk 3 and the gap between the projection 1d and the disk 3 into the recesses 1b and 1e, respectively, and the air is expanded. However, as the surface roughness of the surfaces 1f and 1g of the projections 1a and 1d is predetermined to the range of 0.2 S–0.3 S, the air can be communicated between the inside and the outside of the recesses 1b and 1e through the unevenness of the surfaces 1f and 1g .

Therefore, a reduction in pressure of the air can be suppressed more than the prior art device having the surface roughness of 0.05 S–0.1 S as mentioned previously. As a result, the occurrence of dewing can be avoided.

According to a test using a magnetic disk 3 of 2 inch diameter and rotating the same at 3600 rpm for recording/reproducing, the support 1 constructed to have an outer diameter of 7 mm, an inner diameter of the first projection 1a of 6 mm and a depth of the first recess 1b of 50 μm. In this case, the surface roughness of the first projection 1a was set to 0.1 S–0.6 S, resulting in no occurrence of dewing and adherence of the disk 3 and ensuring stable suction of the disk 3. Since such stable suction was maintained, stable sliding contact condition of the disk 3 with respect to the magnetic head could be attained, and continuous recording/reproducing could be reliably performed.

While the above range of the surface roughness in the test is merely exemplary in the case that the magnetic head supporting device was applied to the SVF device, it is appreciated that the range of the surface roughness may be changed with a change in various parameters such as peripheral speed of the disk 3, outer and inner diameters of the projection 1a of the support 1, and depths of the recesses 1b and 1e. Consequently, the range of the surface roughness of the surfaces 1f and 1g of the projections 1a and 1d of the support 1 should be so set as to permit the communication of the air between the inside and the outside of the recesses 1b and 1e when the disk 3 contacts the surfaces 1f and 1g and further permit the suction of the disk 3 into the recesses 1b and 1e during rotation of the disk 3. In the above-mentioned test, when the surface roughness was less than 0.1 S, there occurred dewing and adherence, and when it was more than 0.6 S, suction of the disk 3 was unstable. Therefore, the surface roughness is set to range from 0.2 S to 0.3 S in the preferred embodiment.

Although the support 1 is formed with the two projections 1a and 1d in the preferred embodiment, it is appreciated that the projection 1a only may be formed.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. In a magnetic head supporting device including a support member for supporting a magnetic head in opposed relationship to a magnetic disk, said support member being formed with an outer peripheral projection to define a recess inside thereof, wherein when said magnetic disk is rotated in proximity to said recess, there is generated a partial vacuum in a space defined between said magnetic disk and said recess to suck said magnetic disk into said recess;

the improvement wherein a surface of said outer peripheral projection of said support member facing said magnetic disk has a predetermined surface roughness permitting communication of air between inside and outside of said recess and permitting suction of said magnetic disk into said recess due to said partial vacuum during rotation of said magnetic disk at a high speed, wherein said predetermined surface roughness is within the range of 0.1 S to 0.6 S.

* * * * *